United States Patent [19]

Howlett et al.

[11] Patent Number: 5,710,880
[45] Date of Patent: Jan. 20, 1998

[54] METHOD AND SYSTEM FOR CREATING A GRAPHIC IMAGE WITH GEOMETRIC DESCRIPTORS

[75] Inventors: Virginia E. Howlett; Laura Janet Butler; Joyce Alison Grauman, all of Seattle, Wash.

[73] Assignee: Microsoft Corporation, Redmond, Wash.

[21] Appl. No.: 333,799

[22] Filed: Nov. 3, 1994

[51] Int. Cl.⁶ .................................................. G06F 17/21
[52] U.S. Cl. .................... 395/168; 395/167; 395/169; 395/170; 395/790; 395/797
[58] Field of Search ............................ 395/150, 151, 395/144, 147, 133, 110, 167, 168, 169, 170, 790, 797; 345/141, 143, 144, 192, 194, 195; 382/284, 298, 301

[56] References Cited

U.S. PATENT DOCUMENTS

| | | | |
|---|---|---|---|
| 5,109,352 | 4/1992 | O'Dell | 395/150 |
| 5,201,032 | 4/1993 | Kurose | 395/150 |
| 5,212,769 | 5/1993 | Pong | 395/150 |
| 5,280,577 | 1/1994 | Trevett et al. | 395/150 |
| 5,301,267 | 4/1994 | Hassett et al. | 395/150 |
| 5,305,433 | 4/1994 | Ohno | 395/150 |
| 5,313,573 | 5/1994 | Takahama | 395/150 |
| 5,333,246 | 7/1994 | Nagasaka | 395/133 |
| 5,416,898 | 5/1995 | Opstad et al. | 395/150 |

OTHER PUBLICATIONS

Simpson, *Mastering WordPerfect® 5.1 & 5.2 for Windows*™, SYBEX Inc., 1993, pp. 155–158.

*Primary Examiner*—Heather R. Herndon
*Assistant Examiner*—Stephen Hong
*Attorney, Agent, or Firm*—Jones & Askew

[57] ABSTRACT

A method for creating a scalable graphic image for display by a pixel-oriented display device. A pixel-based design of the desired graphic image is created and thereafter separated into constituent parts. A geometric descriptor is created for each constituent part. These geometric descriptors are then hinted to ensure that the constituent parts represented by these descriptors can be overlaid or combined to form a display of the desired graphic image for various point sizes. The hinted geometric descriptors for the graphic image are stored in a font file that can be accepted by a rasterizer. In response to a request to display a graphic image, the rasterizer reads the corresponding hinted geometric descriptors from the font file and generates character bitmaps defining the pixels to be illuminated to display the constituent parts. This allows the scaling of the displayed graphic image at different sizes based upon the particular requirements of the user.

21 Claims, 4 Drawing Sheets

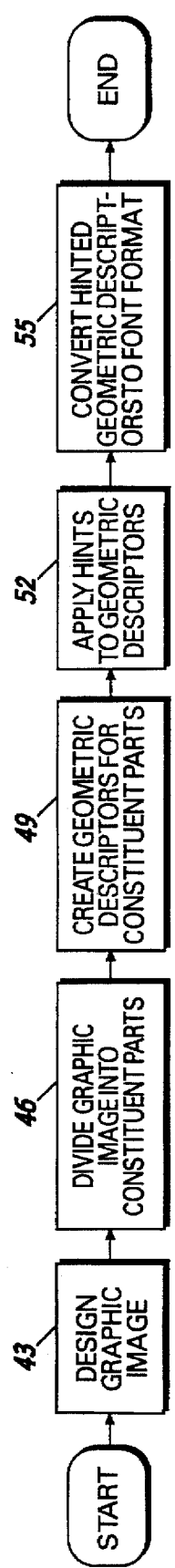
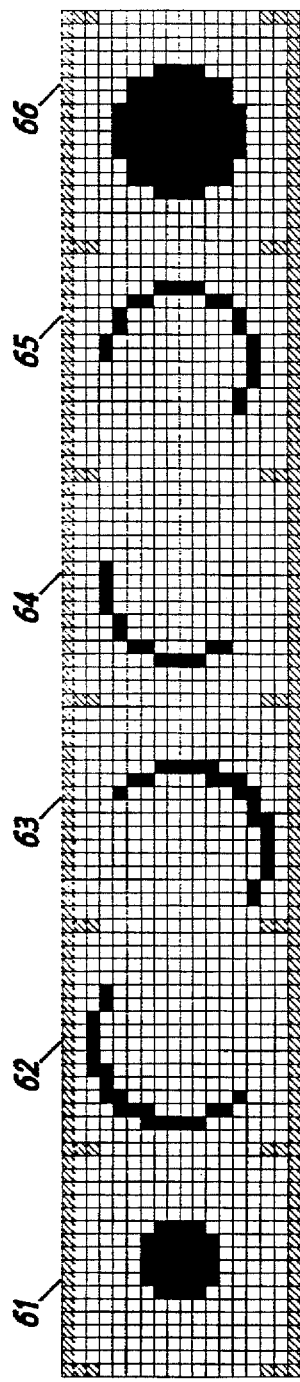
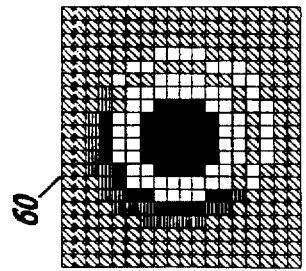
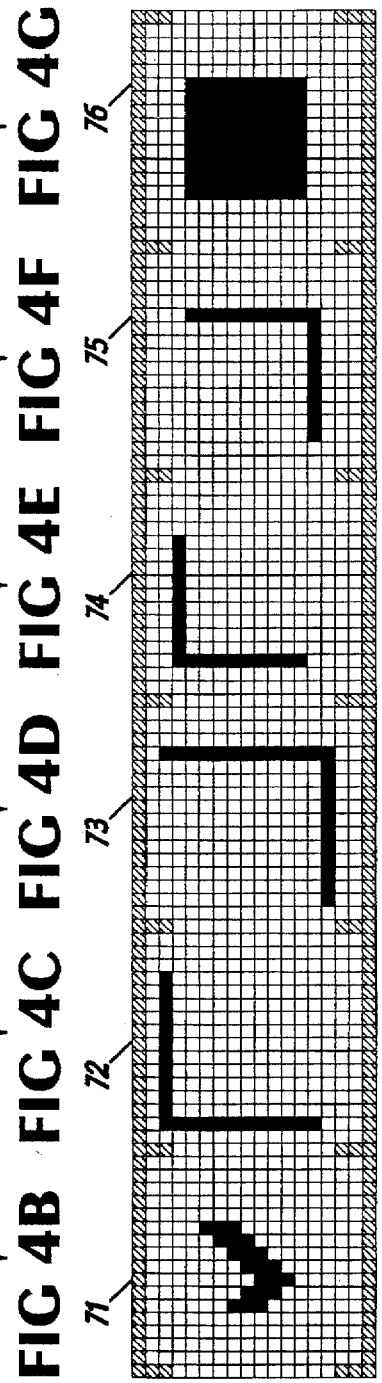
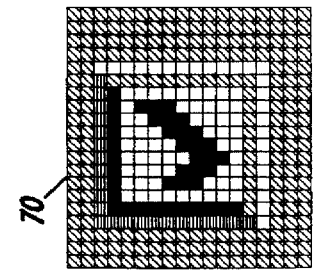
FIG 3
FIG 4A  FIG 4B  FIG 4C  FIG 4D  FIG 4E  FIG 4F  FIG 4G
FIG 5A  FIG 5B  FIG 5C  FIG 5D  FIG 5E  FIG 5F  FIG 5G

METHOD AND SYSTEM FOR CREATING A GRAPHIC IMAGE WITH GEOMETRIC DESCRIPTORS

TECHNICAL FIELD

The invention relates generally to font technology, and in particular to improved methods of creating and displaying interface symbols that can be scaled to accommodate the needs of the user.

BACKGROUND OF THE INVENTION

Computer systems have become commonplace and are found in homes, businesses, schools, and almost any location that a user can travel with a portable computer. People of all ages and physical challenges use computers to make their lives more comfortable, enjoyable or efficient. However, because no two users are alike, an operating system or application program running on a computer system must be able to support, on a customized basis, the computing needs of users. This customized support includes allowing a user to increase or decrease the size of symbols and text displayed by a display device. The present invention addresses the issues of creating and displaying scalable graphic images on pixel-oriented display devices.

The display surface for a pixel-oriented display device consists of a grid of points, or pixels. Each pixel is a discrete segment of an overall field that can be individually illuminated or "darkened" to display an image. A pixel is illuminated when the process that generates the display determines that it is appropriate to activate that portion of the image field. Although pixels are typically rectangular or round in shape for most devices, many newer pixel-oriented display devices include square pixels. The most common pixel-oriented displays are raster scan cathode ray tube (CRT) displays, pixel-oriented LCD displays, and pixel-oriented laser printing devices.

Many operating systems and application programs use graphic images or symbols rather than text to represent the function associated with an interface. These interface symbols allow the user to select a function or to make a decision, such as opening or closing an application, by depressing a key on a keyboard, clicking a button on a mouse, or tapping a stylus or pen. Representative examples of these interface symbols include scroll arrows, radio buttons, checkboxes, and menu bullets.

A common problem with interface symbols is the present inability to easily adjust the size of the symbols to suit the user's needs. For example, a user with poor vision may want to increase the size of the interface symbols because the user is unable to clearly see them. Another user may have strong vision and wish to reduce the size of the interface symbols so other information can be displayed at the same time. An interface symbol also may need to be adjusted to accommodate various display resolutions; at lower display resolutions, it is difficult to display smaller sizes of fonts and interface symbols. For example, the "WINDOWS" operating system runs on a large range of display devices, from 1024×768 dots per inch (dpi) resolution and higher on large monitors to 320×480 dpi and lower on small portable screens. Accordingly, there is a need for graphic images that can be displayed consistently by pixel-oriented display devices at different sizes as required by the user.

A software developer can create an interface symbol by generating a character bitmap file that represents the interface symbol. However, an interface symbol represented by this character bitmap file is not normally scalable, i.e., the height of the interface symbol cannot be adjusted to accommodate the user's viewing needs. To address this scaling issue, the designer of interface symbols can design individual character bitmaps for different sizes of the interface symbols. These character bitmaps for the different sizes of interface symbols are typically stored in computer memory to support the requirements of a user. However, memory in a computer system is a finite and expensive resource and is conserved whenever possible. Storing individual character bitmaps for each size of an interface symbol is not an efficient use of computer memory space. Thus, there is also a need for a method for generating graphic images that conserves the finite and valuable resource of computer memory.

One method for providing scalable interface symbols is applying scaling algorithms, i.e., mathematical scaling, to interface symbols. However, unlike the present invention, mathematical scaling does not allow fine control of the details of symbols at every size and the appearance of the symbols tends to be less than satisfactory for the average user. Specifically, mathematical scaling of graphic images leads to pixel drop-out, and the scaled images are not as clear or precise as the original graphic image. Therefore, there is a need for scalable graphic images that can be hinted to present displayed graphic images that are clear, precise and consistent at different sizes.

In general, text displayed on a pixel-oriented display device can be adjusted or scaled to suit the user's needs. A computer system generally utilizes one or more fonts to display text. A font is a collection of characters designed by a typographer in a consistent style. Specifically, a typographer designs a character outline or "glyph" for each character of a particular font, including characters, numbers, and punctuation. A glyph for a given character in a font is a geometric descriptor, specifically a numbered sequence of points that are on or off a curve defining the boundary of the character. In general, the numbered sequence for the points follow a recognized rule for how points relate to the area to be filled and the area not to be filled when rendering the glyph. For example, for TrueType font descriptions defined within the TrueType Technical Specification Revision 1.5, January 1994, entitled "TrueType 1.0 Font Files" by Microsoft Corporation, the points are numbered in consecutive order so that as a path is traversed in the order of increasing point numbers, the filled area will always be to the right of the path. This glyph or outline description of the character is typically stored within a font file maintained by the computer system.

In response to the information supplied by a font file, the character outline is scaled according to the font size or point size requested by the user and the characteristics of the display device on which it is to be displayed. The character outline may also contain hints, which are routines that, when executed, adjust the shape of the character outline for various point sizes to improve the appearance of the image displayed by a pixel-oriented display device. The fundamental task of hinting is to identify critical characteristics of the original font design and to use instructions to insure that those characteristics will be preserved when the character outline is rendered in different sizes by various display devices.

The need for scalable interface symbols which also conserve valuable memory space has led to the creation of the present invention. The inventors have applied known font generation and hinting applications for text to develop a new and useful method for creating scalable interface symbols. The method developed by the inventors generates interface symbols that are scalable to the user's personal needs, such as visual acuity and display device resolution, while maintaining the integrity of the graphic image. In addition, the present invention conserves computer memory by creating fonts for interface symbols, thereby eliminating the need for storing individual character bitmaps for each size of the interface symbols.

SUMMARY OF THE PRESENT INVENTION

The present invention fulfills the above-described needs by providing a method of creating a scalable graphic image of an interface symbol for display by a pixel-oriented device. In particular, a font is created for an interface symbol by separating the design of the corresponding graphic image into its constituent parts, creating geometric descriptors of the constituent parts, and thereafter hinting these geometric descriptors to ensure that the representations of the corresponding constituent parts can be overlaid to form a display of the graphic image for a range of sizes. In response to a font file containing the hinted geometric descriptors, character bitmaps can be generated to designate the pixels to be illuminated on a display device. These character bitmaps are useful for supporting the drawing of the graphic image, which is completed by overlaying the representations of the constituent parts to display the interface symbol at a selected size.

This unique combination of font generation and hinting technologies supports the generation of scalable interface symbols for software programs. In contrast to the present invention, which supplies a font for desired interface symbols, the prior art relied upon the use of multiple character bitmaps to represent graphic images for various point sizes or used mathematical algorithms to scale the graphic images. Neither prior process produced a completely satisfactory result because the use of multiple character bitmaps required the support computer memory to store the representations of the sized graphic images, whereas the prior mathematical scaling technique failed to produce a precise and accurate representation of the scaled images.

An advantage of the present invention is that users can scale the graphic images to different sizes to satisfy their own visual needs. Another advantage is the displayed graphic images do not suffer from pixel dropout and the images maintain a consistent, clear and precise shape at every size. Yet another advantage is that it is not necessary to store character bitmaps for every size of the graphic image in computer memory, thereby conserving this finite computer resource.

Generally described, the method for creating the scalable interface symbol is initiated by creating a design in pixels of the desired graphic image. This graphic image can be represented on a pixel-oriented display device by illuminating the correct combination of pixels, thereby "filling" the outline of this image. The graphic image is typically designed at a selected "default" size which can later be scaled to the size desired by the user. One feature of the present invention is that the design of the desired graphic image can be readily achieved by using an available paint program which generates a pixel-based representation of the graphic image.

This pixel-based design of the graphic image is then divided into its constituent parts. The division can be accomplished on the basis of colors of the graphic image. For example, all the parts of a graphic image which are dark gray can be designated as a constituent part and all the parts of a graphic image which are light gray can be defined as another constituent part.

A geometric descriptor, also described as an outline or a glyph, is created for each constituent part. The geometric descriptor describes which pixels should be illuminated to produce a representation of the corresponding image, in this case, the constituent part. Specifically, the geometric descriptor includes a numbered sequence of points that are on or off a spline or segment defining the boundary of this image. In general, the numbered sequence for the points follow a recognized rule for how points relate to the area to be filled and the area not to be filled when rendering the geometric descriptor. The TrueType Technical Specification, version 1.5 supplies additional information for a known format and rules for geometric descriptors.

Geometric descriptors for the constituent parts of a graphic image can be created using traditional typography tools known as font editors. Font editor application programs supply a range of tools that support the design and creation of type faces. These programs also can be used to produce both outline and bitmap fonts for display by screen displays, printers, and high resolution imagesetters. Outline fonts are typically created by describing the selected characters as a series of points connected by straight line segments and curves. Bitmap fonts describe the actual pixel patterns for each point size of the selected characters.

The geometric descriptor for each constituent part is then hinted through the use of a hinting program. This hinting process ensures that representations of the graphic image at various sizes can be accurately displayed when the constituent parts are eventually combined or overlaid to form the desired graphic image. A hinting program can apply to a geometric descriptor one or more hints, which are routines that describe how a character should be drawn or rendered for a selected point size. For example, hints can be used to specify relative lengths and angles of the geometric descriptor, whether the vertex of a point should be produced by one or more pixels, and whether an odd pixel length should be absorbed rather than illuminated. Thus, hinting programs support a display by a pixel-oriented display device of a more aesthetic representation of a graphic image to the viewer.

Although the present invention applies hints to describe how a constituent part of a graphic image, rather than a text-based character, should be rendered for display on a pixel-oriented display device, the basic concepts of hinting for text-based characters can be equally applied to graphic images.

The hinting process generally can be considered an iterative process because hints are first applied after viewing a displayed graphic image that is formed by the combination of constituent parts which are represented by geometric descriptors containing no hints. This viewing exercise is typically completed for a range of points sizes of the graphic image. In the absence of hints, this combination of the representations of the constituent parts often leads to an inaccurate display of the graphic image for at least one of the selected point sizes. For example, an interface symbol formed by overlaying the representations of its constituent parts at a selected point size may produce an accurate and pleasing display of the interface symbol, while a display of the same interface symbol at another point size may be inaccurate, thereby indicating the need to apply a hint to resolve this error. Thus, one or more hints can be applied to the geometric descriptors in an attempt to resolve this inaccurate representation of the graphic image. After applying hints to resolve an observed display problem, the resulting displayed image is inspected for the range of sizes to determine the quality of the displayed image for these sizes. To further improve the appearance of the displayed images for the various sizes, one or more additional hints can then be applied to the once-hinted geometric descriptors. This iterative process typically continues until a desired display for the interface symbol is generated for each of the point sizes within the selected size range.

For the font creation process, the iterative hinting process allows a font designer to locate for a display of combined constituent parts any pixel gaps that may occur at various point sizes. In turn, these pixel gaps can be resolved by applying appropriate hints to the geometric descriptors for these constituent parts. Thus, the hinting process determines at a relatively fine level which pixels should be illuminated or "turned on" for different sizes of each constituent part to support an accurate and aesthetically pleasing representation of the desired graphic image.

The hinted geometric descriptors for the constituent parts can be subsequently transferred to a font file having a selected font format. For example, this font file can be stored in TrueType-compatible format, as specified by the TrueType Technical Specification. A font file created in this manner can be called by an application program or the operating system and supplied to a rasterizer to produce character bitmaps. These character bitmaps, which are supplied to a pixel-oriented display device, represent constituent parts that are (1) scaled at a point size requested by the user (or a default scale value) and (2) can be overlaid or combined to display the graphic image as a whole on the display device.

It is therefore an object of the present invention to provide a method for creating a font for graphic images.

It is a further object of the present invention to provide a method for creating graphic images that can be scaled to various point sizes to satisfy the visual needs of the user.

It is a further object of the present invention to provide a method for creating graphic images that can be scaled to different point sizes to accommodate different display device resolutions.

It is a further object of the present invention to provide a method for creating graphic images that can be scaled to various point sizes, thereby supporting the conservation of the finite resource of computer memory by minimizing the number of character bitmaps required to display these scalable graphic images.

It is a further object of the present invention to provide a method for creating graphic images that can be generated and scaled using available font generation and typography tools.

That the present invention meets these objects, and fulfills the above-described needs from the prior art will be appreciated by the detailed description hereinbelow and the attached drawings.

BRIEF DESCRIPTION OF THE DRAWINGS

FIG. 3 is a logical flow diagram for an embodiment of the present invention.

FIG. 4A is an illustration of an interface symbol for a radio button and FIGS. 4B, 4C, 4D, 4E, 4F, and 4G are illustrations of the constituent parts that can be overlaid to form the interface symbol of FIG. 4A.

FIG. 5A is an illustration of an interface symbol for a checkbox and FIGS. 5B, 5C, 5D, 5E, 5F, and 5G are illustrations of the constituent parts that can be overlaid to form the interface symbol of FIG. 5A.

DETAILED DESCRIPTION

Figure 1:
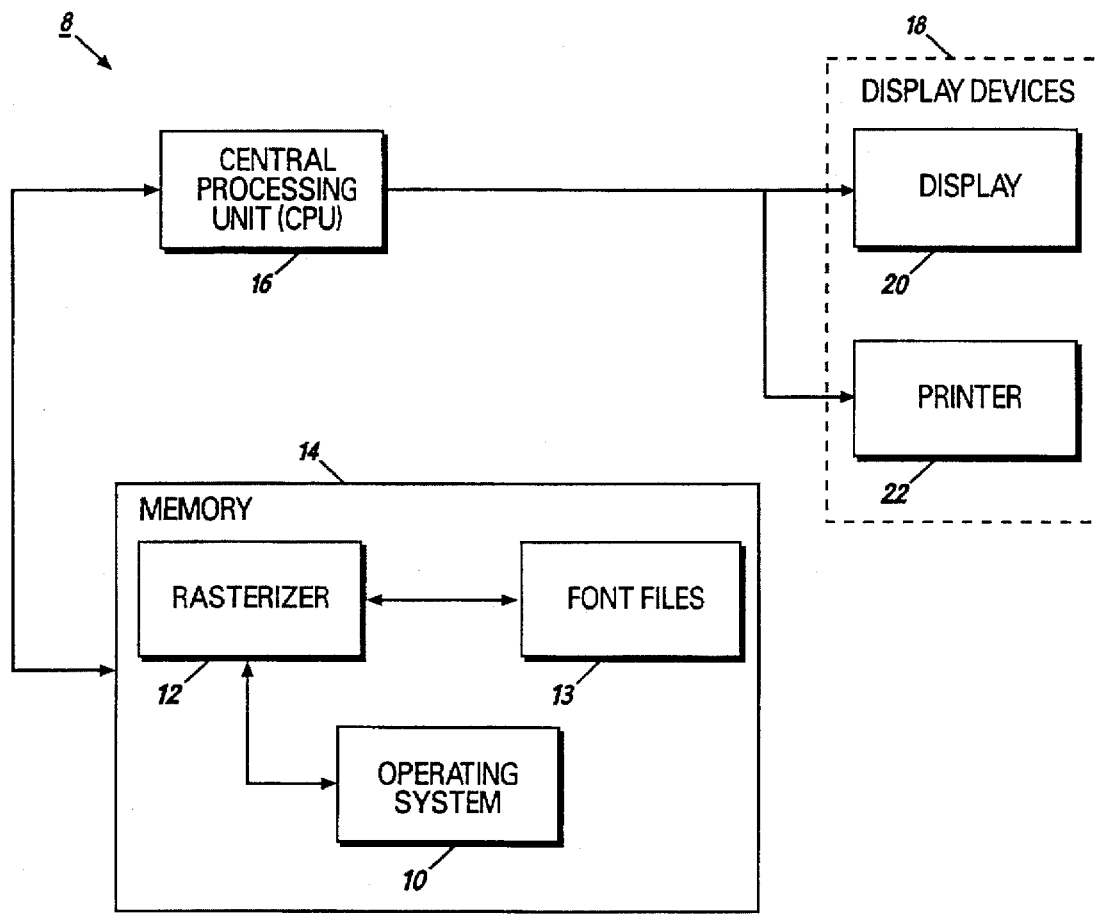
FIG. 1 is a block diagram of a computer system in which the preferred embodiment of the present invention is operative.

Operating systems and application programs often include user interfaces that include an interface symbol that represents a function or action which can be selected by the user. A typical user would like to have the flexibility of changing the displayed size of the interface symbols for an application program or an operating system. While modern operating systems and application programs generally provide the user with the capability of displaying text in various sizes, they typically fail to supply this same feature for interface symbols. In other words, the symbols for user interfaces of software programs typically are assigned a fixed size by the software provider and often cannot be scaled to meet the particular needs of the user.

In contrast, for text-based images, which are represented by one or more font files, the selection of a character size can be changed dynamically and the fonts can be changed independently of modifications to the stored text in memory or a disk file controlled by the application. Modern image processing is generally performed by software routines that perform the function of complex drivers between the operating system and the application. These software routines, collectively described as a rasterizer, accommodate font descriptions specified by the application, or independent third parties, according to descriptor rules set by the manufacturers of the application programs and the operating system. It is the font technology described hereinabove that can be used to support a font for a graphic image, i.e., scalable interface symbols, which is provided by the present invention.

The present invention is directed to the creation of a font for a graphic image, namely an interface symbol, which can be displayed at a plurality of sizes by a pixel-oriented display device. A pixel-based design of the graphic image is created and this design is subsequently divided into constituent parts. A geometric descriptor is generated for each constituent part and these geometric descriptors are hinted as required to ensure that the constituent parts represented by the geometric descriptors can be overlaid or otherwise combined to support a display of the composite graphic image for numerous point sizes. In addition, this set of hinted geometric descriptors can be converted to a known font format, such as the TrueType font format, to supply a font file that can be scaled and rendered by a rasterizer.

The detailed description which follows is presented largely in terms of algorithms and symbolic representations of operations by conventional computer components, including a processor and a memory storage device. These algorithmic descriptions and symbolic representations are the means used by those skilled in the art to most effectively convey the substance of their work to others skilled in the art. An algorithm is generally conceived to be a self-consistent sequence of steps leading to a desired result.

These steps generally require manipulations of physical quantities. Usually, though not necessarily, these quantities take the form of electrical or magnetic signals capable of being stored, transferred, combined, compared, or otherwise manipulated. It is convenient to refer to these signals as bits, values, elements, symbols, descriptors, characters, terms, numbers, records, files or the like. It will be appreciated that all of these terms, as well as similar terms, are associated with appropriate physical quantities and are merely convenient labels applied to these quantities.

Turning now to FIG. 1, a computer system 8 runs an operating system 10 associated with a rasterizer 12 and the font files 13. The constituent parts for the graphic images that are to be displayed are stored in the font files 13. The operating system 10, the rasterizer 12, and the font files 13 can be stored within a memory 14 and operate with a central processing unit (CPU) 16 to support the display of both text and graphic images by one or more of the connected display devices 18. As requested by the operating system 10 or an application program (not shown) running on the computer system 8, the rasterizer 12 reads the font description supplied by the geometric descriptors of the desired font file 13. Significantly, these geometric descriptors can be scaled to support the display of their corresponding images at a variety of point sizes. In response, the rasterizer 12 generates character bitmaps which are supplied as an input to the selected display device 18. These character bitmaps define the physical pixels to be activated for displaying the corresponding image of a text character or a graphic image on the selected display device. The rasterizer 12 will be described in more detail below with respect to FIG. 2.

For the preferred embodiment, the font file 13 contains a description of the geometric characteristics of the constituent parts of the graphic image to be displayed. Nevertheless, it will be appreciated another font file can include a description of the geometric characteristics of text-based characters to support the display of text. For the purposes of this specification, unless otherwise indicated, the font file 13 will be described as containing the geometric descriptors for one or more graphic images. In addition, the terms glyph or outline will be used interchangeably as equivalent terms for geometric descriptor.

A geometric descriptor supplies a definition of points expressed in font units ("FUnits") located within a square referred to as the em square. The number of FUnits per square is selectable by the font designer, within a predetermined range. The number of FUnits per em square is thus an expression of the resolution of the font design selected by the designer. Accordingly, as the FUnits per em square increases, the ability of the font designer to describe finer detail or better defined curvilinear strokes of a geometric descriptor or glyph increases. The font files 13 are preferably compatible with TrueType font technology specified by the TrueType Technical Specification, Revision 1.5, January 1994, entitled "TrueType 1.0 Font Files," by Microsoft Corporation, Redmond, Wash.

The memory 14, which is connected to the CPU 16 via a bi-directional signal path, may be implemented as a volatile memory storage device, such as random access memory (RAM), or nonvolatile memory storage device, such as a fixed disk, or a combination of both memory components. For example, the operating system for a general purpose computer system is typically stored within nonvolatile memory and, upon boot, the operating system is allocated a portion of volatile memory to directly support computer operations. Thus, the operating system 10, as well as the rasterizer 12 and the font files 13 can be stored in a permanent manner within nonvolatile memory. Subsequent to booting the operating system 10, the rasterizer 12 and one or more of the required font files 13 can be copied to the temporary memory mechanism of volatile memory.

Although the disclosed embodiment shows the rasterizer 12 and the font files 13 stored within a memory storage device that is directly accessible by the CPU 16, it will be appreciated that the rasterizer 12 and the font files 13 also can be stored within a memory storage device associated with one of the devices 18.

The CPU 16 is typically implemented as a microprocessor, such as the models 80386 or 80486 that are available from Intel Corporation, Santa Clara, Calif. The CPU 16 operates in combination with computer software, such as the operating system 10 and application programs, to control the operations of the computer system 8 and to supply the functions desired by the computer user. To simplify the representation of the known architecture of a general purpose computer system, conventional computer components, including computer resources such as a direct memory access controller, an interrupt controller, and input/output (I/O) controllers, as well as video and printer adapter devices, are not shown. However, it will be appreciated that the CPU 16 is connected to and supported by conventional computer components via one or more system busses that support communications of control, address, and data signals between the CPU 16 and these standard computer components.

For the preferred embodiment, the operating system 10 is the "WINDOWS" operating system. The operating system 10 can include an user interface having interface symbols, such as the interface symbols shown in FIGS. 4A and 5A, to represent certain functions for selection by the computer user. When the operating system 10 (or an application program) makes a request for the display of a particular graphic image, namely an interface symbol, appropriate parameters for the geometric description are obtained from the font files 13 and converted for use by the rasterizer 12. The rasterizer 12 subsequently performs scaling, hinting (if required), and scan conversion operations on the geometric descriptors to support the construction of character bitmaps. A character bitmap is constructed for each of these geometric descriptors to define the pixels to be activated or "turned on" for displaying the image on a display device 18.

The display devices 18 include a display or monitor 20 and a printer 22, which represent typical pixel-oriented display devices. The display 20 can be implemented as a CRT display or an LCD display and the printer 22 can be implemented as a dot matrix printer or a laser printer. Those skilled in the art will appreciate that the display 20 and the printer 22 are only two examples of pixel-oriented display devices and that other such devices may be used with an embodiment of the present invention.

Although the disclosed operating environment shows the rasterizer 12 and the font files 13 as part of an operating system 10 running on a CPU 16, it will be appreciated that the display devices 18 can include "smart" output devices having a microprocessor and memory for supporting the operations conducted by the rasterizer 12. Specifically, the rasterizer 12 and the font files 13 can be incorporated within the display controller or the printer controller to support pixel-oriented display functions.

Figure 2:
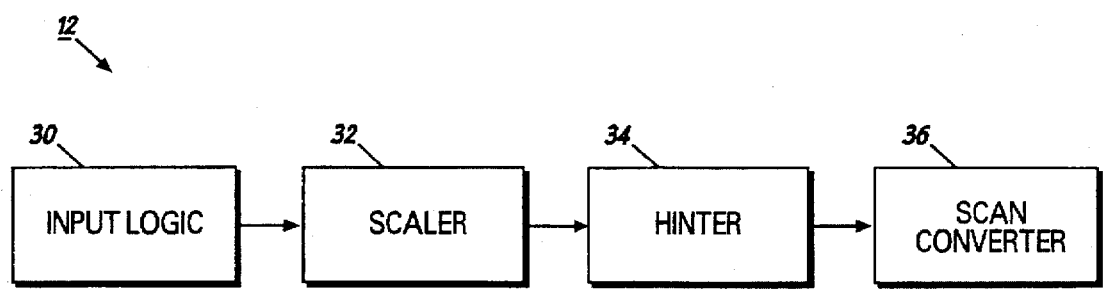
FIG. 2 is a block diagram that illustrates the components of a rasterizer for rendering a graphic image for a pixel-oriented display device.

It will be useful to review the general operation of a rasterizer, such as the rasterizer 12, which supports the display of a graphic image by a pixel-oriented display device, prior to a detailed examination of the its source of input data, namely the scalable graphic image. FIG. 2 is a simplified block diagram that illustrates the operating components of a rasterizer. Referring now to FIGS. 1 and 2, to support the generation of constituent part character bitmaps for the display devices 18, the rasterizer 12 includes input logic 30, a scaler 32, a hinter 34, and a scan converter 36. When an operating system 10 requests use of a selected graphic image for display, the input logic 30 accepts the corresponding selected file from the font files 13 maintained by the memory 14. The input logic 30 thereafter reads the geometric descriptors from the selected font file. In addition, the input logic 30 receives information to support the scaling of the geometric descriptors, including the point size of the graphic image to be displayed and the predetermined pixel size or resolution of the selected display device 18. Both pieces of this scaling information can be supplied to the input logic 30 by either the application program or the operating system 10.

The input logic 30 supplies the geometric descriptors, the specified point size, and the pixel size for the selected display device 18 to the scaling logic 32. In response, the scaling logic 32 scales the geometric descriptors to generate scaled descriptions in physical pixel coordinates. This maps each geometric descriptor from the FUnits of the em square into physical pixels for the selected display device 18. Accordingly, the geometric descriptors are scaled as a function of the predetermined physical pixel size of the physical size (height in points) of the graphic image to be displayed and the resolution in pixels per inch on the display device 18 upon which the image is to be displayed.

Upon completing the scaling operation, the scaling logic 32 outputs the scaled geometric descriptors to the hinter 34. The hinter 34 can execute a set of routines that adjust the shape of the scaled geometric descriptors for the requested point size and resolution to fit the appropriate boundaries of the pixel grid. These routines are typically stored as part of the geometric description of the graphic image that is supplied by the font file 13 to the rasterizer 12. Thus, the hinter 34 outputs to the scan converter 36 geometric descriptors that have been scaled for the selected size and device resolution and adjusted to the appropriate boundaries of the pixel grid.

In response, the scan converter 36 produces character bitmaps and "fills" the boundary of each geometric descriptor by designating the pixels requiring illumination to display the image on the selected display device 18. According to the conventions set forth by the TrueType Technical Specification, the preferred scan converter 36 generates a character bitmap comprising pixels which are to be illuminated or turned on whenever their centers are inside or exactly on the boundary of the geometric descriptor.

FIG. 3 is a logical flow diagram of an embodiment of the present invention. In particular, this flow chart shows the steps for a method for creating a scalable graphic image without the use of a prior mathematical scaling technique. Referring now to FIGS. 1 and 3, the method is initiated at the START step and, at step 43, the desired graphic image is designed. A designer can design the graphic image having a default size by using a paint program to produce the design in pixels. In this manner, the pixel-based design can be stored as a character bitmap file or font bitmap file. A typical file format for the pixel-based design is a Pict file, which is a Macintosh file standard for paint-based graphics. One example of a paint program is the Studio32 paint program, which is available from Electronic Arts of San Mateo, Calif. It will be appreciated that the design of the graphic image also can be completed by hand and thereafter digitized to produce a data file compatible with the remaining process steps.

Once the design of the graphic image has been created in step 43, the pixel-based design is then divided in step 46 into constituent parts. In the preferred embodiment of the invention, the pixel-based design of the graphic image is broken down on the basis of color. Thus, all parts of the graphic image having the same color are designated as a single constituent part. For example, if the graphic image consisted of the colors black, white and dark gray, then there would be a black constituent part, a white constituent part and a dark gray constituent part. It will be appreciated that this division of the components of the graphic design is an economical method because a symbol comprising multiple components is typically rendered or drawn by separately drawing the components based on display location and their associated colors.

In step 49, a geometric descriptor, also described as a glyph or an outline, is created for each constituent part. A font editor program can be used to create each geometric descriptor. For each constituent part, its corresponding bitmap image output by either a digitally scanned image or a paint program can be imported to the font editor program. This bitmap image can then used as a template to permit the designer to trace the outline of the constituent part, thereby creating its geometric descriptor. The preferred font editing program is the Font Studio program, which is available from Letraset of Paramus, N.J. It will be appreciated that other font editor programs, such as Fontographer by Altsys Corporation of Richardson, Tex. can be used to support the creation of the geometric descriptors for the constituent parts.

Those skilled in the art will understand that font editor programs are commercially available application programs that are useful for producing both outline and bitmap font files. Font editor application programs also can be used to produce hints to ensure optimal display output of characters at small point sizes for low-resolution display devices and to supply optimal "on-screen" rendering of bitmap fonts. Font editors also can be used to produce anti-aliased bitmap fonts to provide crisper, cleaner on-screen representations of font symbols by reducing the jagged edges associated with the diagonal lines of adjacent pixels. Font editors are further useful for creating kerning tables that describe how pairs of characters should be spaced closer together or further apart to produce the most readable effect for this combination of characters to a viewer.

In step 52, these geometric descriptors are hinted as required to fill in any pixel gaps or dropouts that may occur when the constituent parts represented by the geometric descriptors are overlaid to form the desired graphic image for a range of values of point sizes. This hinting process can be performed by using a hinting program, such as the preferred TypeMan program, which is available from Type Solutions, Inc. of Plaistow, N.H. Hinting programs are useful for supplying hints that enable a display of a more aesthetic view of the graphic image to the viewer. The hinting routines or instructions, which are created by the hinting program in response to instructions by the font designer, can be stored as a part of the corresponding geometric descriptors of the font file 13. During the rasterizing process, these stored hinting routines can then be accessed and implemented by the hinter 34 (FIG. 2) when the graphic image is rendered. This insures that the original design proportions of the constituent parts are maintained to display the composite graphic image even at low display resolutions and/or small font sizes.

It will be appreciated that the hinting process of step 52 is an iterative design process. The designer initially views a graphic image formed by a display of overlaid constituent parts that are represented by "unhinted" geometric descriptors for a range of point sizes. This initial viewing exercise supports the detection of pixel dropout events or inaccurate displays of the desired graphic image. After applying one or more hints to the geometric descriptors in an attempt to solve an observed display problem, the graphic image produced by the combination of the "hinted" geometric descriptors is inspected for a range of sizes to determine the quality of the displayed image for these sizes. If necessary, one or more additional hints can then be applied to further improve the appearance of the displayed images for the various sizes. This iterative process typically continues until a desired display for the interface symbol formed from the combination of constituent parts is generated for each of the point sizes within the size range.

At the conclusion of the hinting process, the hinted geometric descriptors, which represent the constituent parts of the desired graphic image, are stored as font tables by the hinting program within a common data file, such as the font file 13. This file can be supplied as a source of input data to the rasterizer 12 and, in turn, the constituent parts represented by the hinted geometric descriptors can be rendered to display the graphic image. However, it is also useful to convert the file of hinted geometric descriptors into another font format that is viewed as an industry standard format, such as the preferred TrueType font format. Accordingly, the file output by the hinting program can be converted to another font format in step 55. The process for creating a font for a graphic image is terminated at the END step.

Although the font format conversion task can be treated as an optional step in the process, those skilled in the art will appreciate that this conversion process supplies several advantages and is a preferred step for this described embodiment. For example, by converting the TypeMan font format to the TrueType font format, the original file size is decreased to support the conservation of computer memory.

When the TypeMan font format file is converted to the TrueType font format file, a number of redundant font tables are stripped to reduce the original file size. For this particular example, certain TypeMan-specific tables, namely the TSI0, TSI1, TSI2, TSI3, TSI4, Kern, and LTSH font tables, are stripped from the original font format file. The TSI0–TSI4 tables are TypeMan-specific tables that are not required for use by the TrueMan format. The Kern table, which is used to specify kerning pairs, is not required for generating the font for the associated interface symbol. The LTSH table, which is used to control how a font character is scaled in either the X or Y direction, is not required because the interface symbol always maintains its aspect ratio when scaled, i.e., the X and Y directions are proportionately scaled. In addition, certain tables are preferably added to the resulting font format file during the conversion process, including the OS/2, Name, and Grid-fitting and Scan-conversion Procedure (GASP) tables. The OS/2 table is the metric table for the "WINDOWS" operating system and the OS/2 operating system and can specify certain ascent and descent values, subscript and strikeout information, IBM classification, and Panose ID. The name table preferably contains the copyright notice, the font family name, the sub family name, the unique name, the full font name, the version number, the Postscript name, and any associated trademark information. The GASP table prevents the interface symbol from being anti-aliased when the operating system uses a font smoothing technique.

When an application program or operating system calls for the rendering of one of the graphic images, the corresponding font file 13 is supplied to the rasterizer 12. In turn, the constituent parts represented by the hinted geometric descriptors are scaled, hints are implemented, and character bitmaps are generated to define the pixels to be illuminated for the corresponding constituent parts In turn, the display of the selected graphic image is preferably accomplished by (1) calculating the position on the display of the selected graphic image and the size of this image; (2) declaring the area where the graphic image is to be placed for the display; and (3) drawing in iterative fashion each of the constituent parts represented by the hinted geometric descriptors until the selected graphic image is formed. As will be described in more detail below with respect to Table I, these drawing tasks are preferably supported by the operating system 10.

An interface symbol represents a control that a user can interact with to select options, change settings, etc. within an operating system or application program environment. A representative example of an interface symbol, the radio button 60, is shown in FIG. 4A. The radio button 60 can be used to represent a single choice in a limited set of mutually exclusive choices. For a group of radio buttons, a user normally can only "select" one at a time. When the radio button 60 is selected, the circle is filled; when the radio button 60 is not selected, the circle is empty. Accordingly, when the user selects one radio button in a group of radio buttons, the control associated with the selected radio button turns on and the circle within the selected radio button is filled. In contrast, the control operation associated with each of the remaining radio buttons turns off, as represented by an empty circle within each of these radio buttons.

For example, a word processing program may allow a user to select horizontal text justification based upon three mutually exclusive control choices: (1) left justified, (2) centered, and (3) right justified. A radio button 60 can be associated with each of these control choices to allow the user to select the desired horizontal text justification operation.

The radio button 60 comprises six components 61–66 or constituent parts, each part preferably having a separate color. A font file 13 that supports the radio button 60 can be formed by storing the "hinted" versions of the geometric descriptors of these constituent parts for this interface symbol within a common font-formatted file. FIGS. 4B–4G are illustrations of geometric descriptors that represent the constituent parts 61–66. FIG. 4B shows the center button 61 (black), which is also described as a bullet, to indicate when the radio button 60 is selected by a user. FIG. 4C shows the upper-left outer arc 62 (dark gray), FIG. 4D shows the lower-right outer arc 63 (white), FIG. 4E shows the upper-left inner arc 64 (black), FIG. 4F shows the lower-right inner arc 65 (light gray), and FIG. 4G shows the background 66 (default value is gray, but can change to the color white if the radio button 60 is in the selected state). When combined, the constituent parts or arcs 62–65 supply a three-dimensional appearance of a circle for the radio button 60. The background 66, which is larger than the center button 61, supplies a contrasting background for the center button 61, which is placed within the center of the background 66 when the radio button 60 is selected by the user. In other words, the center button appears within the central portion of the radio button 60 only when this particular radio button is selected by the user.

Each of the geometric descriptors for the constituent parts 61–66 is shown in FIGS. 4B–4G as a collection of "darkened" or black squares representing illuminated pixels that are superimposed on a pixel grid. Nevertheless, it will appreciated that the constituent parts 61–66 can be drawn and displayed in separate colors, as evidenced by the composite formed from these constituent parts, the radio button 60 of FIG. 4A.

A "pseudo code" routine for drawing a display of the graphic image for the radio button 60 in the nonselected state is shown in Table I.

TABLE I

```
glyph[1]='radio button background'
glyph[2]='radio button upper-left inner arc'
glyph[3]='radio button lower-right inner arc'
glyph[4]='radio button upper-left outer arc'
glyph[5]='radio button lower-right outer arc'
color[1]='button face color'
color[2]='button dark shadow color'
color[3]='button light color'
color[4]='button shadow color'
color[5]='button hilight color'
for i=1 to 5
    SetTextColor (hDC, color[i]);
    TextOut (hDC, x, y, glyph[i], 1)
```

Referring to FIG. 1 and FIGS. 4A–4G and to Table I, the routine begins with a handle to the device context in which the image of the radio button will be drawn. A loop is completed for each glyph or hinted geometric descriptor for the character bitmap representing the image of the radio button 60. With each iteration, the color is set to the appropriate color for the representation of the corresponding constituent part. After the color is set, a "TextOut" call is made to draw the glyph into the given device context. By completing the iterative steps of this routine, each of the constituent parts of the radio button is drawn for display by the selected display device to eventually form this interface symbol. Although the above-described routine can be incorporated as part of an application program or a utility program, the drawing function supplied by this routine is preferably completed by the operating system 10.

Referring now to FIG. 1 and FIGS. 4A–4G, a display of the radio button 60 is formed by (1) generating the character bitmaps for its constituent parts 61–66 and (2) drawing the represented constituent parts for display by a display device 18. In particular, the hinted geometric descriptor for each constituent part is called from the corresponding font file 13 and scaled per the requested point size and the display resolution of the display device 18. The hints for the hinted geometric descriptors are thereafter implemented and corresponding character bitmaps are generated during the scan conversion operation by the rasterizer 12. It will be understood that these character bitmaps are based upon the definition of the constituent parts set forth by the hinted geometric descriptors, including any associated hinting routines. Based upon these character bitmaps, a display of the radio button 60 is generated by drawing the upper-left outer arc 62, lower-right outer arc 63, upper-left inner arc 64, lower-right inner arc 65, and background 66. These drawing operations overlay or combine the representations of the constituent parts to form a composite display of a nonselected version of the radio button 60. A computer program routine based upon the pseudo code in Table I is useful for setting the colors of the constituent parts and drawing the representations of the constituent parts to generate the graphic image. For the disclosed embodiment, this routine is preferably included as part of the operating system 10.

FIG. 5A is an illustration of another graphic image, the interface symbol for a checkbox 70, and FIGS. 5B–5G are illustrations of geometric descriptors representing the constituent parts 71–76 that can be overlaid to form this interface symbol. The checkbox 70 is another interface symbol that represents a control for simple Boolean yes/no operations. Although checkboxes can be grouped within a user interface, this grouping does not prevent the user from turning on or off the checkboxes in any combination.

By selecting the checkbox 70, the state of the associated control operation is toggled and the check mark 71 either appears within the checkbox 70 or disappears from the checkbox 70. For example, when the associated control operation is turned on or enabled, the checkbox 70 shows a check mark with the box formed by the combination of the edges 72–75. In contrast, when the associated control operation is turned off or disabled, the check mark 71 no longer appears within the checkbox 70, i.e., the checkbox 70 shows the background 76 within the box formed by combination of the edges 72–75. When combined, the edges 72–75 supply a three-dimensional appearance of a box for the checkbox 70.

The checkbox 70 is formed from six constituent parts, specifically the check mark 71, the upper-left outer edge 72, the lower-right outer edge 73, the upper-left inner edge 74, the lower-right inner edge 75, and the background or center 76. The check mark 71 is shown in FIG. 5B, the upper-left outer edge 72 is shown in FIG. 5C, the lower-right outer edge 73 is shown in FIG. 5D, the upper-left inner edge 74 is shown in FIG. 5E, and the lower-right inner edge 75 is shown in FIG. 5F. The background 76, also described as the center, is shown in FIG. 5G.

Similar to the constituent parts 61–66 of the radio button of FIG. 4A, each of the geometric descriptors for the constituent parts 71–76 is shown in FIGS. 5B–5G as black squares that represent illuminated pixels superimposed on a pixel grid. Nevertheless, it will understood that these constituent parts can be drawn and displayed in separate colors as shown by the composite of these constituent parts, the checkbox 70 in FIG. 5A. In particular, the constituent parts include the check mark 71 (black), the upper-left outer edge 72 (dark gray), the lower-right outer edge 73 (white), the upper-left inner edge 74 (dark black), the lower-right inner edge 75 (light gray) and the center 76 (default value is gray, but can change to white if the checkbox 70 is in the enabled state). A font file 13 can include each hinted version of the geometric descriptors that represent the constituent parts 71–76 to support the scalable display of the checkbox 70.

As a result of the present invention, a graphic image, such as the interface symbol provided by the radio button 60, can be displayed at different sizes by storing geometric descriptors associated with the constituent parts for the graphic image rather than storing an individual character bitmap for each different size of the image. Accordingly, the creation of a font for a graphic image directly supports the conservation of computer memory.

Figure 6:
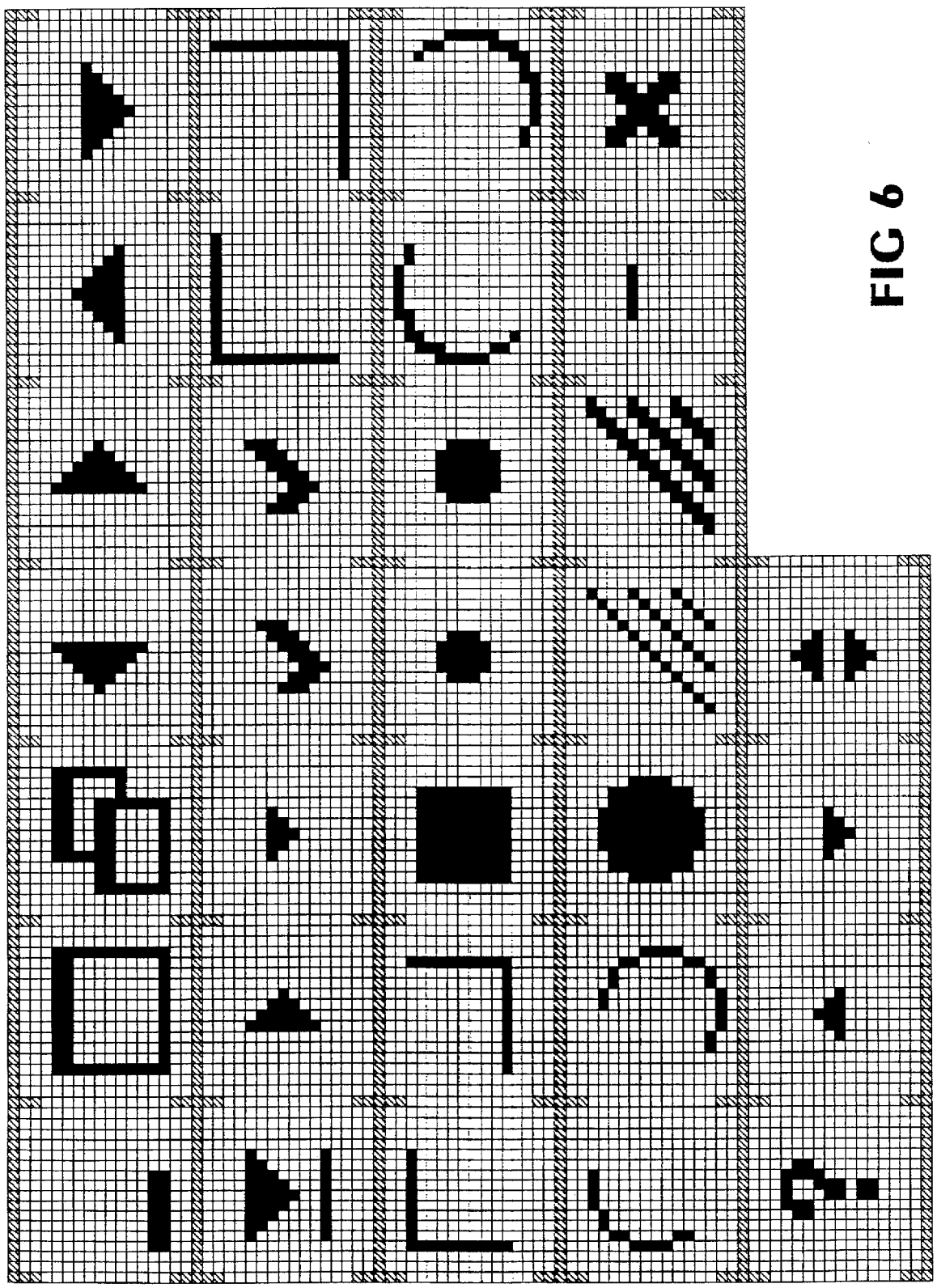
FIG. 6 is an illustration of representative graphic images of a font.

FIG. 6 is an illustration of a set of geometric descriptors representing graphic images that collectively form a font of scalable graphic images. Each of these geometric descriptors is superimposed on a pixel grid and represents a constituent part that can be used to form an associated interface symbol. Specifically, for each of the geometric descriptors, the "darkened" or black squares represent illuminated pixels on a pixel grid. The representations of the geometric descriptors in FIG. 6 supply an example of a font containing scalable graphic images for interface symbols; the present invention can be extended to a wide range of graphic images and is not limited to the illustrations supplied by this drawing.

Figure 7:
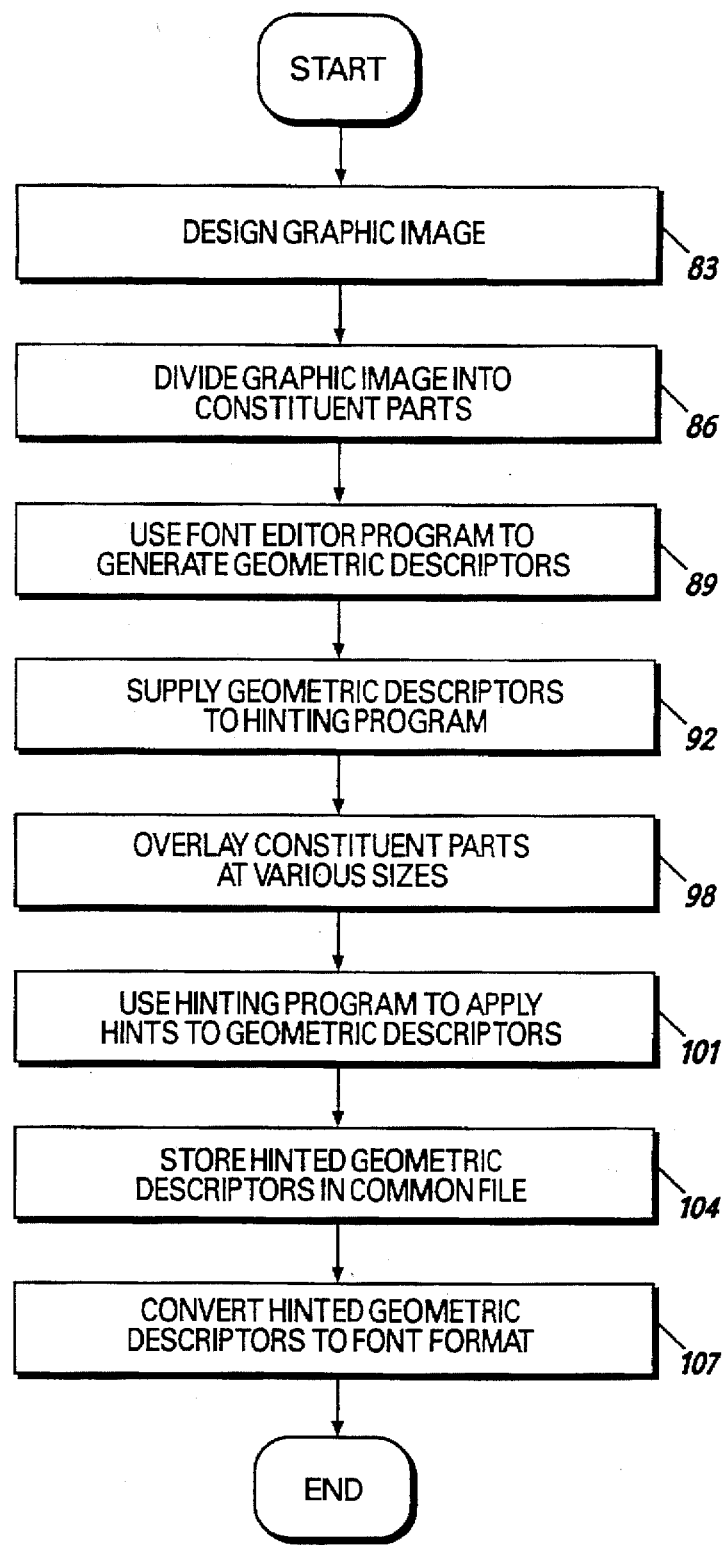
FIG. 7 is a logical flow diagram of the preferred embodiment of the present invention.

FIG. 7 is a logical flow diagram of the preferred steps for the method of creating a font for graphic image. This method will be described below with respect to a representative example of a graphic image, the interface symbol supplied by the radio button 60 of FIG. 4A. It will be understood that this method can be used to create a font of other graphic images and that the present invention is not limited to applications for interface symbols, such as the radio button 60 of FIG. 4A or the checkbox 70 of FIG. 5A.

Referring now to FIG. 1, FIGS. 4A–4G, and FIG. 7, the process is initiated in the START step and proceeds to step 83. In step 83, the graphic image to be displayed is chosen, and the image is produced in pixels using a commercially available paint program, namely the preferred Studio32 program. In this case, the interface symbol for the radio button 60 is created for a selected default size. In step 86, the graphic image for the radio button 60 is divided into its constituent parts based on color. For the example of the radio button 60 of FIG. 4A, the constituent parts include the center button 61 (black), the upper-left outer arc 62 (dark gray), the lower-right outer arc 63 (white), the upper-left inner arc 64 (black), the lower-right inner arc 65 (light gray) and the background 66 (default value is gray, but can change to the color white if the radio button 60 is in the selected state).

The preferred font editor program, the Font Studio program, is used in step 89 to generate a glyph, or geometric descriptor, for each of the constituent parts 61–66. These geometric descriptors are stored within a file supplied by the font editor program. It will be appreciated that the font editor program creates an outline font file containing geometric descriptors for the constituent parts.

In step 92, the file containing the set of geometric descriptors is supplied as an input to a hinting program to permit the application or one or more hints to these geometric descriptors. The hinting operations are preferably supported by the TypeMan program. The outline font file generated by the Font Studio program is converted to a format compatible with the TypeMan program and this converted file is supplied to the TypeMan program for hinting.

Within the TypeMan program, the hints for each geometric descriptor can be written to describe how each control point of the geometric descriptor is to "behave" in relation to some fixed reference point, such as the left side bearing point on the boundary box of the geometric descriptor. Those skilled in the art will appreciate that some of the geometric descriptors may require hints for certain point sizes, whereas other geometric descriptors may not require such hints. In other words, the application of hints will vary on a case-by-case basis for the selected graphic image.

Prior to and after applying one or more hints, the TypeMan program enables a font designer to view on a display device 18, typically a display 20, a piece-by-piece overlay of the constituent parts for the selected graphic image for a range of point sizes. This overlaying of representations of constituent parts is accomplished in the TypeMan program by setting an offset value to zero for the boundary box of a subsequent constituent part. For the example of two constituent parts, this instruction to set an offset value to zero operates to superimpose the boundary box for the second constituent part directly on top of the boundary box for the first constituent part. This overlay process allows the designer to locate pixel gaps appearing in the display of the overlapped parts for various point sizes and to resolve such pixel gaps by using hints. To complete the evaluation of the selected graphic image, it will be appreciated that this overlaying process is typically completed for each of the remaining constituent parts necessary to form the selected graphic image.

In view of the foregoing, the representations of the constituent parts 61–66 are overlaid one-by-one for a range of point sizes by using the tools supplied by the TypeMan program in step 98. In particular, this overlaying of constituent parts is accomplished by aligning the left side bearing point 67 of each of the constituent parts 61–66. The left side bearing point 67 is shown in each of the representations of the constituent parts 61–66 in FIGS. 4B–4G. When the left side bearing point 67 for each of the constituent parts 61–66 is aligned, a composite representation of these parts is generated for visual inspection by the designer. Hints can be applied in response to this visual inspection. Accordingly, in step 101, representations of overlaid constituent parts are examined at a range of point sizes for pixel dropout or any other irregularities and hints are applied to the corresponding geometric descriptors as deemed necessary by the designer.

It will be understood that the left side bearing points for separate text-based characters of a font are normally offset from one another in the TypeMan program. This offset between the left side bearing points is intended to maintain the proper spacing between the text-base characters, thereby clearly displaying the individual text characters for viewing. In contrast, for the preferred embodiment, this offset is set to zero to permit the alignment of the left side bearing points 67 for each of the constituent parts 61–66, thereby supporting the combination of these constituent parts to form a representation of the associated interface symbol.

The hinted geometric descriptors are stored in a common file generated by the TypeMan program in step 104. The format for this TypeMan-compatible file is then converted into a format for a TrueType-compatible file in step 107. In this manner, each hinted geometric descriptor representing a constituent part for the radio button 60 is transferred to a TrueType-compatible file to enable these hinted geometric descriptors to be operated upon as TrueType-compatible font characters. This optional conversion process is preferably supported by the use of the Ingredients software program, which is a program for editing font files and is available from Projective Solutions, Inc. of New York, N.Y. Various font tables can be added and stripped by use of the Ingredients program during this conversion process. For this example, certain TypeMan-specific tables, namely the TSI0, TSI1, TSI2, TSI3, TSI4, Kern, and LTSH font tables, are stripped from the original font format file. In addition, certain tables are preferably added to the resulting font format file, including OS/2, Name, and GASP tables. The font creation process terminates at the END step.

This format conversion operation effectively reduces the size of the TypeMan-compatible file. For example, this conversion process converted a TypeMan-compatible file of 83 kBytes to a TrueType-compatible file of 10 kBytes, thereby substantially reducing required memory storage space for this file. Nevertheless, it will be appreciated that this conversion step is an optional step within the overall font creation process because a conventional rasterizer can read and display the contents of a TypeMan-compatible font file.

When an application program or the operating system 10 calls for the display of a graphic image representing an interface symbol, a font file 13 for this selected interface symbol is accessed and the hinted geometric descriptors are supplied as an input to the rasterizer 12. The rasterizer 12 then generates a character bitmap that represents the pixels to be illuminated to display each constituent part of the checkbox interface symbol. Based upon these character bitmaps, the operating system 10 draws the checkbox 70 for display on a selected display device 18 by overlaying or combining the images of its corresponding constituent parts.

Focusing now upon the drawing routine used by the operating system 10, the position of the radio button 60 is calculated on the dialog box for the operating system's user interface. The physical size of this radio button 60 is then calculated and an area of the user interface is designated as the location for this scalable interface symbol. The upper-left outer arc 62 is drawn in the color associated with this edge, namely dark gray. The lower-right outer arc 63 is drawn in its color, specifically white. The upper-left inner arc 64 is drawn in its color, dark black. The lower-right inner arc 65 is drawn in its color, light gray. The background 66 is drawn in its default color, specifically, gray. The center button 61 is drawn in its color, black, if the radio button 60 has actually been selected by the user of the computer 8. Otherwise, the background area remains empty and colored within its default color. Each of the colors for these constituent parts of the radio button 60 are considered to be default colors; other colors can be substituted for these named colors.

In summary, it will be understood that the present invention can create a font for a graphic image which can be displayed at a plurality of sizes on a pixel-oriented display device. A pixel-based design of this graphic image is created and the design is subsequently divided into its constituent parts. Each constituent part is preferably associated with a particular color. Geometric descriptors corresponding to the constituent parts are generated. This set of geometric descriptors supplies representations of the constituent parts which can be overlaid to represent the graphic image. If required, these geometric descriptors can include hints to ensure that the representations of the constituent parts truly combine to form the graphic image for a range of point sizes. Accordingly, the font file contains hinted geometric descriptors representing the constituent parts of desired graphic images, such as interface symbols. In response to the character bitmaps for the constituent parts of a selected graphic image, a drawing program can create a display of a selected graphic image by overlaying the representations of these constituent parts.

While there has been shown and described the preferred embodiment of the invention, it will evident to those skilled in the art that various modifications and changes may be made thereto without departing from the spirit and the scope of the invention as set forth in the appended claims and equivalents thereof.

We claim:

1. A method of creating a scalable graphic image that can be displayed at a plurality of sizes by a pixel-oriented display device, comprising the steps of:

creating a pixel-based design of said graphic image;

dividing said pixel-based design into constituent parts based on the colors of said constituent parts; and generating geometric descriptors for said constituent parts, said geometric descriptors operative to support a combination of representations of said constituent parts to display said graphic image for each of said plurality of sizes.

2. A method as recited in claim 1 further comprising the step of converting said set of geometric descriptors to a format compatible with a font program.

3. The method of claim 2, wherein said converting step comprises:

storing said geometric descriptors as a set of font tables in a font file; and removing selected ones of said font tables that are not needed by said font program.

4. The method as recited in claim 1 wherein each of said constituent parts has a single one of said colors.

5. A method of creating a scalable graphic image that can be displayed at a plurality of sizes by a pixel-oriented display device, comprising the steps of:

creating a pixel-based design of said graphic image;

dividing said pixel-based design into constituent parts based on the colors of said constituent parts;

generating a geometric descriptor for each constituent part; and hinting each geometric descriptor to produce a set of hinted geometric descriptors representing constituent parts that can be overlaid to form a display of said graphic image for each of said plurality of sizes.

6. The method as recited in claim 5 further comprising the step of converting said set of hinted geometric descriptors to a format compatible with a font program.

7. The method of claim 6, wherein said converting step comprises:

storing said hinted geometric descriptors as a set of font tables in a font file; and removing selected ones of said font tables that are not needed by said font program.

8. The method as recited in claim 5 further comprising displaying said graphic image on said pixel-oriented display device in response to reading said set of hinted geometric descriptors.

9. The method as recited in claim 5 wherein each of said constituent parts has a single one of said colors.

10. A method of creating a scalable graphic image that can be displayed at a plurality of sizes by a pixel-oriented display device, comprising the steps of:

creating a pixel-based design of said graphic image;

dividing said pixel-based design into constituent parts based on the colors of said constituent parts;

using a font editor program to generate a geometric descriptor for each constituent part;

using a hinting program to hint each geometric descriptor to produce a set of hinted geometric descriptors representing constituent parts that can be overlaid to form a display of said graphic image for said plurality of sizes; and converting said set of hinted geometric descriptors to a format compatible with a selected font program.

11. The method as recited in claim 10 wherein each of said constituent parts has a single one of said colors.

12. A method of creating a scaleable graphic image for display by a pixel-oriented display device at a plurality of point sizes, comprising the steps of:

creating a pixel-based design of a graphic image having a default size defined by a predefined one of said point sizes;

dividing said pixel-based design into constituent parts based on colors of said pixel-based design, each constituent part having a single one of the colors;

importing said constituent parts into a font editor program;

using said font editor program to create geometric descriptors for said constituent parts;

supplying said geometric descriptors to a hinting program;

using said hinting program to apply hints to said geometric descriptors to produce a set of hinted geometric descriptors for each of said plurality of point sizes;

storing said set of hinted geometric descriptors as a set of font tables in a font file; and converting said set of font tables to a format compatible with a font program.

13. The method as recited in claim 12 wherein said step of creating a pixel-based design of said graphic image comprises using a computer paint program to create the pixel-based design; and said converting step comprises removing selected ones of said font tables that are not needed by said font program.

14. The method as recited in claim 12 wherein said step of creating a pixel-based design of said graphic image comprises using a computer paint program to create the pixel-based design;

said step of creating geometric descriptors for said constituent parts comprises using said font editor program to trace each outline of said constituent parts; and said converting step comprises removing selected ones of said font tables that are not needed by said font program.

15. The method of claim 12 further comprising displaying said graphic image on said pixel-oriented display device in response to accessing said converted font tables.

16. A computer readable medium on which is stored a program module executable on a computer characterized by a pixel-based display device, the program module operative to render a scaleable graphic image in response to accessing a font file maintained in a memory storage device, the font file comprising:

a plurality of geometric descriptors representing constituent parts of a pixel-based design corresponding to the graphic image and having a plurality of colors, each constituent part corresponding to a portion of the pixel-based design and having only one of the colors of the pixel-based design, each geometric descriptor scaleable for a predefined range of point sizes to support rendering of the scaleable graphic image by the pixel-oriented display device at any one of the point sizes.

17. The computer-readable medium of claim 16, wherein the geometric descriptors further comprise hints for shaping the appearance of the scaleable graphic image presented by the pixel-oriented display device, each hint associated with one of the point sizes.

18. For a computer characterized by a pixel-oriented display device having a display resolution and a program module maintained in a computer memory and executable on the computer, the program module operative to render a scaleable graphic image by performing the steps of:

accessing a font file comprising a plurality of geometric descriptors representing constituent parts of a pixel-based design corresponding to the graphic image, the pixel-based design having a plurality of colors, each constituent part corresponding to a portion of the pixel-based design and having only one of the colors of the pixel-based design, each geometric descriptor scaleable for a range of point sizes to support rendering of the scaleable graphic image by the pixel-oriented display device at any one of the point sizes;

scaling the geometric descriptors in response to a selected one of the point sizes and the display resolution of the pixel-oriented display device;

responsive to the scaled geometric descriptors, generating character bitmaps that define pixels of the pixel-oriented display device to be illuminated for displaying a representation of the constituent parts; and responsive to the character bitmaps, drawing the representation of each of the constituent parts to render the scaleable graphic image at the selected point size.

19. The program module of claim 18 further operative to perform the step of responding to at least one hint of the scaled geometric descriptors by applying each hint to the corresponding scaled geometric descriptor.

20. The program module of claim 18 wherein said step of drawing the representation of each of the constituent parts to render the scaleable graphic image comprises the step of overlaying each said character bitmap to render said graphic image.

21. The program module of claim 18 wherein said step of drawing the representation of each of the constituent parts to render the scaleable graphic image comprises the steps of:

calculating a position and a size of said scaleable graphic image on said pixel-oriented display device;

declaring an area in which said scaleable graphic image is to be drawn; and drawing in iterative fashion each said constituent part until said scaleable graphic image is displayed.

\* \* \* \* \*